US012743676B2

(12) United States Patent
O'Connor et al.

(10) Patent No.: US 12,743,676 B2
(45) **Date of Patent: *Sep. 22, 2026**

(54) DIRECT PARTICIPANTS DURING A SOCIAL NETWORKING EVENT

(71) Applicant: DATA PACIFIC HOLDING PTY LTD., Riverview (AU)

(72) Inventors: Louise O'Connor, Riverview (AU); Brett Couston, Riverview (AU)

(73) Assignee: DATA PACIFIC HOLDING PTY LTD., Riverview (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/874,241

(22) Filed: Jul. 26, 2022

(65) Prior Publication Data

US 2023/0022937 A1 Jan. 26, 2023

Related U.S. Application Data

(63) Continuation of application No. 15/780,968, filed as application No. PCT/AU2016/051164 on Nov. 28, 2016, now Pat. No. 11,430,074.

(Continued)

(51) Int. Cl.

| | |
|---|---|
| ***G06Q 10/40*** | (2026.01) |
| ***G06F 16/9535*** | (2019.01) |
| ***G06Q 10/06*** | (2023.01) |
| ***G06Q 10/10*** | (2023.01) |
| ***G06Q 50/00*** | (2024.01) |

(Continued)

(52) U.S. Cl.

CPC ......... *G06Q 10/40* (2026.01); *G06F 16/9535* (2019.01); *G06Q 10/06* (2013.01); *G06Q 10/10* (2013.01); *G06Q 50/00* (2013.01); *H04L 51/52* (2022.05); *H04L 67/10* (2013.01); *H04L 67/55* (2022.05)

(58) Field of Classification Search

CPC ........ G06Q 50/01; G06Q 10/06; G06Q 10/10; G06Q 50/00; G06F 16/9535; H04L 51/52; H04L 67/10; H04L 67/55

USPC .......................................................... 705/319

See application file for complete search history.

(56) References Cited

U.S. PATENT DOCUMENTS

| | | | | |
|---|---|---|---|---|
| 7,711,782 B2 | 5/2010 | Kim | | |
| 2004/0254809 A1* | 12/2004 | Teicher | ................ | A63F 13/795 705/1.1 |

(Continued)

OTHER PUBLICATIONS

International Search Report for International Application No. PCT/AU2016/051164, mailed Feb. 17, 2017 (4 pages).

(Continued)

*Primary Examiner* — Suraj M Joshi
*Assistant Examiner* — Ayfele F Woldemariam
(74) *Attorney, Agent, or Firm* — FINNEGAN, HENDERSON, FARABOW, GARRETT & DUNNER, LLP

(57) ABSTRACT

A method of directing participants during a social networking event includes the step of accessing a participant database that includes a plurality of records, each record including a participant identifier and associated participant attributes. A social networking instance is generated that links participant identifiers based on participant attributes, to define matched participants for meeting during the social networking event. Meet up directions are sent to the matched participants.

22 Claims, 6 Drawing Sheets

Related U.S. Application Data

(60) Provisional application No. 62/263,601, filed on Dec. 4, 2015.

(51) Int. Cl.
*H04L 51/52* (2022.01)
*H04L 67/10* (2022.01)
*H04L 67/55* (2022.01)

(56) References Cited

U.S. PATENT DOCUMENTS

2008/0140650 A1* 6/2008 Stackpole ............... H04W 4/02 707/999.005
2012/0259791 A1* 10/2012 Zoidze .................. G06Q 10/10 705/319
2013/0290188 A1* 10/2013 Olliphant ........... G06Q 20/3223 705/44
2014/0258260 A1* 9/2014 Rayborn ................ G06Q 50/10 707/707
2014/0280532 A1* 9/2014 MacNiven ............. H04L 67/52 709/204
2015/0066789 A1* 3/2015 Keith ..................... G06Q 50/01 705/319
2015/0317750 A1* 11/2015 Benhuri ............. H04L 65/1073 705/319
2016/0232625 A1 8/2016 Akutagawa
2016/0343027 A1* 11/2016 Cheng ................ G06Q 30/0255

OTHER PUBLICATIONS

Written Opinion of the International Search Authority for International Application No. PCT/AU2016/051164, mailed Feb. 17, 2017 (5 pages).

* cited by examiner

DIRECT PARTICIPANTS DURING A SOCIAL NETWORKING EVENT

This application is a Continuation of U.S. application Ser. No. 15/780,968, filed Jun. 1, 2018 (now U.S. Pat. No. 11,430,074), which is a National Stage Entry of PCT/AU2016/051164, filed Nov. 28, 2016, which claims priority to U.S. Provisional Application No. 62/263,601, filed Dec. 4, 2015 the contents of which is incorporated herein by reference in its entirety to provide continuity of disclosure.

FIELD OF THE INVENTION

Various exemplary embodiments of a method of directing participants during a social networking event are described herein, as well as exemplary embodiments of a system for directing participants during a social networking event.

SUMMARY

An aspect of a method for directing participants during a social networking event includes the steps of:

- accessing a participant database that includes a plurality of records, each record including a participant identifier and associated participant attributes;
- generating a social networking instance that links participant identifiers based on participant attributes, to define matched participants for meeting during the social networking event, and
- sending meet up directions to the matched participants.

The method may include enabling terminal devices of participants to communicate with a server of the computer system over a data communication network.

The method may be for directing participants during the social networking event at at least one location, and may include the prior step of sending an event notification to the terminal devices of prospective participants to notify them of the social networking event and the at least one location, either simultaneously or at different times. For example, the participants may first be notified, then, once other conditions have been met, the participants can be notified of the location. Also, the event may be taking place at more than one location. A location can be any physical area, such as a venue, a table, a bar, a chair, etc.

The social networking event may be divided into successive meeting rounds. However, it will be appreciated that these could also be regarded as discrete networking events such that the method is repeated for each successive meeting round. Thus, embodiments of the method can be performed simultaneously or at different times at multiple locations.

Generating a social networking instance may include the prior step of receiving inputs from the terminal devices of prospective participants that they are present during the event at the location.

The method may include determining, for each prospective participant, that the prospective participant is present during the event at the location, whether the associated attributes of the participant identifier of that prospective participant meet certain criteria for being included in generating the social networking instance. If not, the method may include sending instructions to the terminal device of that prospective participant to prompt that prospective participant to enter further information for inclusion in the associated attributes of that prospective participant.

Generating a social networking instance may include the prior step of sending a notification to the terminal devices of prospective participants that are present during the event at the location that a social networking instance is to be created, and receiving notifications from the terminal devices of the prospective participants indicating whether the prospective participants are to be included in generating the social networking instance.

Generating a social networking instance may include linking participant identifiers based on participant attributes, to define matched groups of participants, associated with linked participant identifiers, for meeting during the social networking event.

Generating a social networking instance may include linking participant identifiers based on participant attributes, to define matched pairs of participants, associated with linked participant identifiers, for meeting during the social networking event.

Sending meet up directions to the matched participants may include defining meet up directions about where to meet matched participants at the location during the social event.

The method may include generating successive social networking instances during the event at the location. In that case, generating a successive social networking instance may include the prior step of sending a notification to the terminal devices of prospective participants that are present during the event at the location that a successive social networking event is to be created for investigating whether the prospective participants wish to participate in the successive event. Thus, the method may include receiving notifications from the terminal devices of the prospective participants indicating whether to be included or to participate in the successive social networking instance. Instead, in another embodiment, a participant that indicates that they wish to participate in an event can be included automatically when generating the social networking instances.

The method may include receiving notifications from the terminal devices of the matched participants as to whether they have met, and storing the notifications in association with their participant identifiers. These notifications may be considered when generating a successive social networking instance, to avoid matching the participants that were matched in a previously generated social networking instance. The server may be configured to use the notifications to send data to the terminal devices of participants that have met to display, on their terminal devices, information such as introductory questions and scoring points in a game.

The method may include receiving feedback information from terminal devices of the matched participants, and storing the feedback information in relation to their respective participant identifiers for consideration in the construction of a successive social networking instance, thereby to improve relevance of matched participants during each successive networking instance.

The method may be for directing social networking of participants during an event at multiple locations. In that case, the method may include generating an event identifier and sending notifications to the terminal devices to notify prospective participants of the event and the multiple locations. The event identifier may already have been generated. Alternatively, there may be multiple events at a single location.

The method may be for directing participants during a social networking event occurring at multiple locations simultaneously. In that case, the method may include, for each location, generating a social networking instance that links participant identifiers based on participant attributes, to define, for each location, matched participants for meeting during the social networking event at those locations.

The method may include sending meet up directions to any of the matched participants directing them to relocate to another one of the multiple locations.

The step of generating a social networking instance may include the step of storing participant compatibility values in a matrix.

The method may include the step of manipulating the participant compatibility values so as to avoid duplicating pair matchings from a previous social networking instance or to avoid undesirable potential matches, such as those between friends.

The server may be configured so that the participants can check themselves into or out of an event without being actively prompted. For example, a GUI generated by the server on the terminal devices can be configured to permit a participant to select the option. Thus, the participants can check themselves in or out before or during the event.

Various exemplary embodiments of a computer system for directing participants during a social networking event is configured to perform the following steps:

accessing a participant database that includes a plurality of records, each record including a participant identifier and associated participant attributes;

generating a social networking instance that links participant identifiers based on participant attributes, to define matched participants for meeting during the social networking event, and sending meet up directions to the matched participants, Thus, various exemplary embodiments of a computer system for directing participants during a social networking event include non-transitory computer executable instructions, which when executed, configure the computer system to perform the method as herein defined, described, and illustrated.

Various exemplary embodiments of a terminal computer device for communication with a computer system as defined above, include non-transitory computer executable instructions, which when executed, configure the terminal computer device to enable the method as herein defined, described, and illustrated.

Various exemplary embodiments of a computer program product include non-transitory computer executable instructions, which, when executed, cause a computer system and terminal computer devices to perform the following steps:

accessing a participant database that includes a plurality of records, each record including a participant identifier and associated participant attributes;

generating a social networking instance that links participant identifiers based on participant attributes, to define matched participants for meeting during the social networking event, and sending meet up directions to the matched participants, Various exemplary embodiments of a computer program product include non-transitory computer executable instructions for configuring a computer system and terminal computer devices to perform the method as herein defined, described, and illustrated.

DESCRIPTION OF EMBODIMENTS

Figure 1:
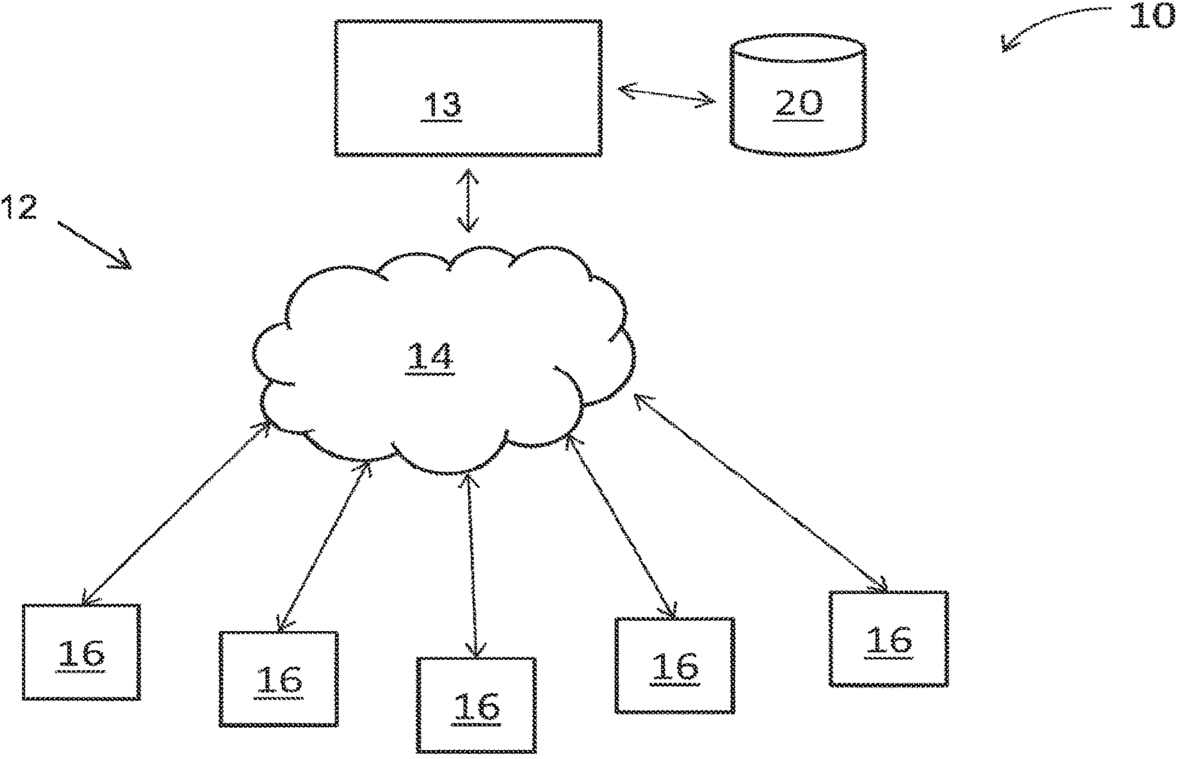
FIG. 1 shows a schematic diagram of an exemplary embodiment of a computer system for directing participants in a social networking environment.

In FIG. 1, reference numeral 10 broadly illustrates an exemplary embodiment of a computer network that includes a computer system 12. The computer system 12 includes a server 13 and a plurality of terminal computer devices 16, the server 13 being configured to communicate over a data communication network 14 with the terminal computer devices 16 such as smart phones, tablets, laptops, desktop computers and other data processing apparatus. The terminal computer devices 16 can be wireless and can be configured to communicate with the data communication network 14 wirelessly. The data communication network 14 can be the Internet.

Use of the word "computer" is reference to any one or more, or a network of, data processing devices or apparatus. Thus, use of the word "server" is not to be understood as limited to a particular machine situated in a network. Rather, a "server" can be in the form of any one or more, or a network of, data processing devices or apparatus that are capable of being used to administer functions of other devices in a network. These could include one or more mobile devices. The one or more mobile devices can be programmed with a suitable software application or "App".

The server 12 and the terminal computer devices 16 are enabled so that they are capable of being used for directing participants during a social networking event. As will be seen below, the server 12 and the terminal devices 16 are also configured to allow the terminal devices 16 to be used to send feedback information to the server 12.

The term "social networking event" is used to refer to an event that includes a situation in which people socially network, in other words socially meet other people. There are different contexts in which social networking takes place. For example, it can include dating events, business networking events, and the like. It is not limited to entertainment and recreational events. For example, it could be used to refer to an event at which sellers and buyers may congregate, such as at a show or exhibition. It can also manifest in groups of people that can include two or more people. For purposes of explanation, the embodiment described below is explained in the context of a method of using a computer system for directing participants in social networking events in the form of dating or meeting events. The use of such an example is not intended to limit the scope of the appended claims and is for illustrative purposes only.

Figure 2:
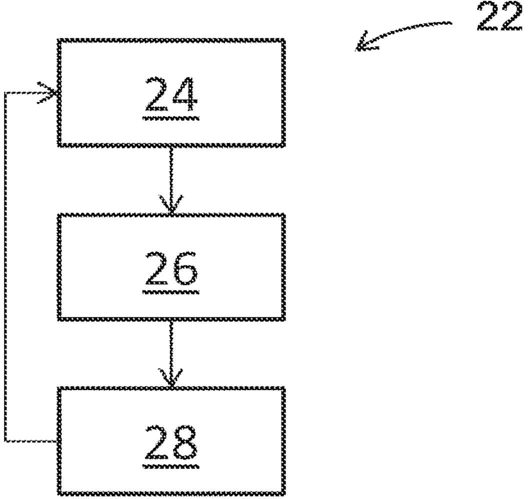
FIG. 2 shows a flow diagram of an exemplary embodiment of a method for directing participants in a social networking environment.

A top-level flowchart representing an embodiment of a method for directing participation of participants in a social networking environment is shown in FIG. 2 and indicated with reference numeral 22. Broadly, the method 22 includes using the server 12 to access, at 24, a participant database 20 that includes a plurality of records, each record including a participant identifier (ID) and associated participant attributes. The database can be populated by records of prospective participants that subscribe to an online service hosted by the server 12. The participant ID can be a record representing a name, an alias, an anonymous handle, or the like, and the attributes can include gender, sexual orientation, age, height, interests, work, skills, education and the like. The attributes can be represented by scores in each of the aforementioned characteristics. For example, in the category "male", a certain age may be given a numerical score while a height may also be given a numerical score. Thus, within the category "male", the scores can be agnostic to allow various data processing operations to be carried out on the scores.

Scoring data can be collated by carrying out various surveys using the server 12 and the terminal devices 16. The scores can thus be used in various algorithms to achieve matching between participants.

At 26, the server 12 generates a social networking instance that links participant identifiers based on participant attributes, to define matched participants for meeting during the social networking event.

The term "social networking instance" refers to a computer-generated data construct that at least links participant identifiers together in groups and/or pairs based on the attributes associated with the participant identifiers and/or feedback information as is explained in more detail below.

The server 12 uses the social networking instance to generate meet up directions or instructions that are sent, at 28, to the terminal devices 16 of the matched participants during the event to direct them regarding a manner and time of meeting. It will be appreciated that a set time will, in most instances, not be necessary because the meet up directions or instructions are generated during the event.

Figure 3:
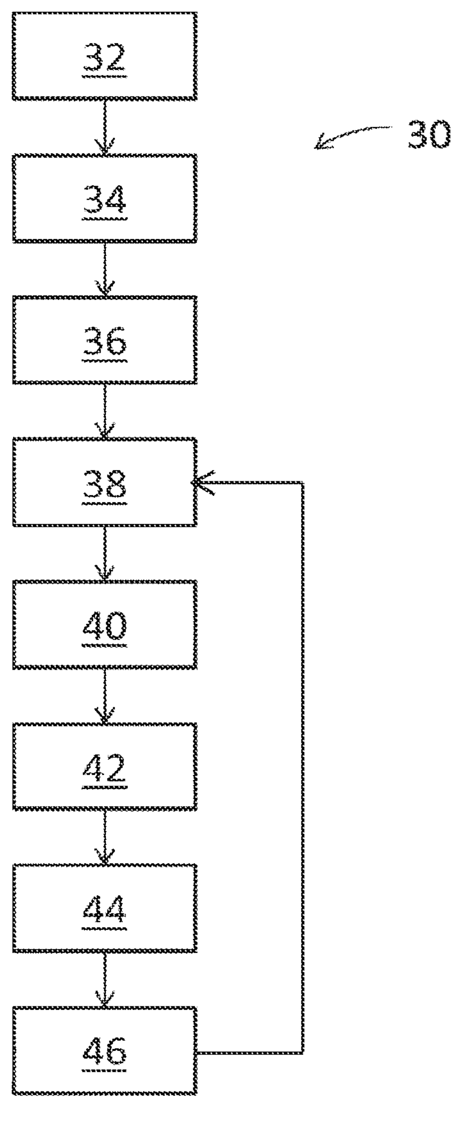
FIG. 3 shows a flow diagram of the steps in FIG. 2 in more detail.

Referring to FIG. 3, a flow diagram 30 represents one embodiment of a method of using a computer system for directing participants during a social networking event. The method includes using the server 12 to direct social networking of participants during a social networking event in the form of a dating event that is held at a single location.

Prior to the event, at 32, the server 12 identifies the prospective participant identifiers from the database 20 and sends event notifications to the terminal devices 16 of the prospective participants to notify them of the upcoming dating or meeting event and the location for the event. In the case of having an online presence, such as a website, upcoming events can also be published on the website.

At 34, the server 12 receives confirmation, in the form of data carried in electronic signals, such as wireless signals, from prospective participants that they are present at the location attending the event. Such wireless signals can be generated by the terminal devices 16, in the form of wireless devices controlled by the prospective participants. In some cases, the event may be managed by a host. In that case, the participants can check in using a device controlled by the host.

In one example, the server 12 may send instructions to the terminal devices 16 of the prospective participants to prompt them to enter an input that confirms that they are at the event. Thus, the server 12 is configured to generate computer-readable instructions that can be received by the terminal devices 16 such that the devices 16 generate an appropriate user interface to facilitate such input. Alternatively, the devices 16 can be programmed with a suitable software product, which, when executed, generates the user interface. Execution of the product may be triggered by instructions received from the server 12.

In another embodiment, the location of the terminal devices 16 can be detected, for example shortly before the event starts, and if that detected location corresponds with the location of the event, then a notification can be generated by the terminal device 16 and sent to the server 12. In another embodiment, those techniques can be combined to detect a location of the terminal device 16 and, in response, to prompt a prospective participant to confirm that they are at the location and interested in participating in the event. It follows that the terminal devices 16 can be GPS-enabled, allowing the server 12 to detect the location of the respective terminal devices 16.

The server 12 then determines, at 36, for each prospective participant that is at the event, whether or not the attributes, associated with their participant identifier, that are stored in the database 20, are sufficient or appropriate for inclusion in generating an upcoming social networking instance for an upcoming dating round. In other words, the server 12 determines if there is sufficient or appropriate information for a participant to be meaningfully matched with other participants, and, if not, the server 12 sends a notification to the terminal device 16 of that prospective participant to that effect. This can also be by way of the generation of a graphic user interface (GUI) via a software application or "App" executed on the relevant terminal device. In response, the prospective participant can enter and send information to the server 12, via his or her terminal device 16, for storing that information as attributes associated with that prospective participant's identifier in the database 20. Once the information is obtained from participants, it is not necessary to return to step 36 before each round, unless, for example, it is detected that a participant has joined the event late and that the participant needs to input more information.

Optionally, at 38, the server 12 generates and sends notifications to the terminal devices 16 of the prospective participants to notify them that a dating round will start soon, and prompts, at 40, the participants to indicate whether or not they wish to participate in that round. If a notification in the affirmative is received by the server 12 from the terminal device 16 of a participant, then the participants identifier is flagged for inclusion in generating the social networking instance in the form of the data construct, for that round. In other words, this functionality affords a prospective participant the opportunity to notify the server 12 effectively to opt-in or opt-out of successive rounds of dating or meeting, as the case may be.

The server 12 generates the social networking instance at 42 that links the participant identifiers based on their participant attributes, so as to define matched participants for meeting during that round at the social networking event.

Figure 4:
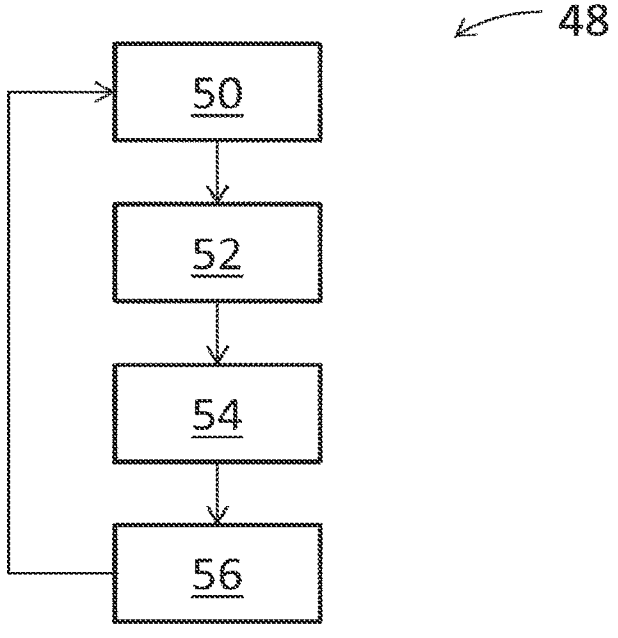
FIG. 4 shows a flow diagram of a step in FIG. 2 in more detail.

FIG. 4 shows a flow diagram of steps that are involved in one example of generating a social networking instance which includes, at 50, determining the number of participants that opted in for participating in that round, and, at 52, determining a number of groups of participants, and at 54, matching or pairing participants of the groups, and sending, at 56, directions to the terminal devices 16 of the participants about how to meet with the group and/or paired participants respectively.

The server 12 is configured to record the matches that have been made. Thus, the server 12 can be used to avoid matching participants who have met before.

The directions can include, for example location information such as a room or an area at a venue, a table number, and the like. The directions can also include other information for helping with finding the matched or paired participant, for example it can include at least one of: an image of the paired participant, an alias, an anonymous handle and a name of the paired participant. The terminal devices 16 and server 12 can also be enabled to include a messaging feature for contacting the paired participant to assist with finding the paired participant if needed. The terminal devices 16 and server 12 can also be enabled so that audio and video communications can be established between paired participants so that they can find each other.

The terminal devices 16 and the server 12 are also configured to enable sending of a confirmation notification from the terminal devices 16 to the server 12 to notify the server 12 that participants have in fact met with the group and/or the participant with whom they were paired. At 44 (FIG. 3), such confirmation notification is received and the database 20 is updated.

In one embodiment, the terminal device 16 of a participant can generate a screen component in the GUI for receiving a code from the other participant that triggers the confirmation notification that is sent to the server 12. Instead, in another embodiment, the terminal devices 16 can use near field communication (NFC) or some other proximity detection method to generate the confirmation notification. In another embodiment, the confirmation notification need not be considered for each successive dating round. Instead, the server 12 records the matches, and can therefore avoid pairing participants with same participants in a successive round. The server 12 can also be configured to carry out various data processing operations on the recorded matches to generate data representing various items of useful information, such as like trends, et cetera.

After a dating round and after meeting with a paired participant, feedback information can be received, at 46 (FIG. 3), by the server 12 from terminal devices 16 of the participants, and added to the database 20. The feedback information can be added substantially immediately and so can immediately be associated with the participant ID of that participant, so that the feedback information can be used immediately by the server when determining a successive social networking instance for a successive dating round. This can be used to determine improved meaningful matches with other participants in each successive round. In another embodiment, the feedback information can be entered after an event, for example the next day, which means that the feedback information is not necessarily considered before each successive round. However, the feedback information can be considered at the next event.

In another embodiment, the server 12 can be used to direct participants during a social networking event, such as a dating event, that is spread out over multiple locations or venues. In such a case, prospective participants are detected at the various locations, and participants that opt in to participate in a dating round are flagged at the server 12. In another embodiment, the participants need not opt in before each round, but rather only opt in for the event, and are automatically included in each round of the event. Also, participants can check themselves in or opt in for an event without necessarily having to be prompted to do so. The server 12 may be configured so that, at events that are "opt in" events, the participants can be automatically checked out before each round and prompted if they would like to check in for an upcoming round. It will be appreciated that the server 12 could be configured so that the participants can register an interest in all the rounds and so be automatically checked in for upcoming rounds.

Figure 5:
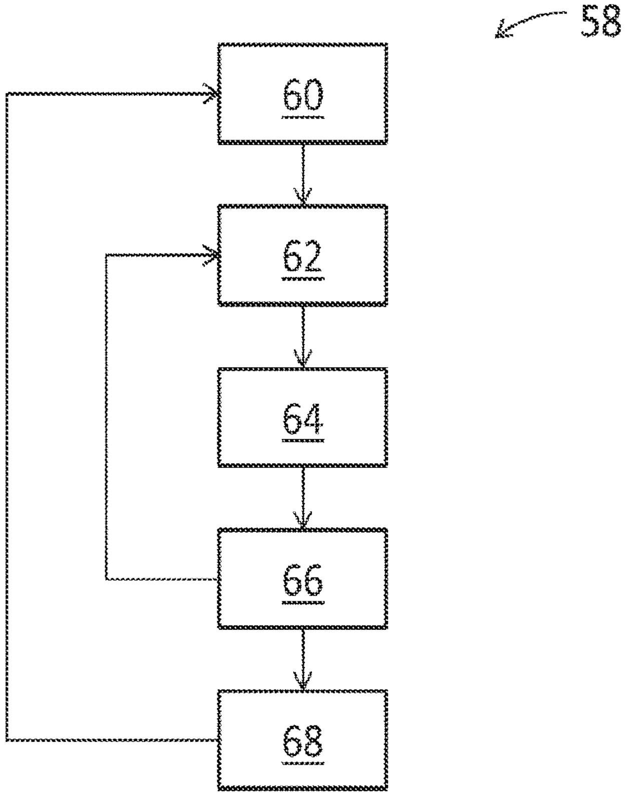
FIG. 5 shows a flow diagram of a step in more detail in another embodiment of a method for directing participants in a social networking environment, in this example, at one or more particular locations.

In FIG. 5, reference numeral 58 generally indicates a flowchart that represents part of a method of using a computer system for directing participants during a social networking event. At 60, participants that wish to participate during a dating round at each location are identified and included when generating the social networking instance for that dating round at that location. As described above, identification of the participants can be by way of a software product being executed on the terminal devices 16 that make use of the GIPS capabilities of the terminal devices 16 that communicate the location of the terminal devices 16 to the server 12.

At 62, the server 12 executes a loop for each location, and determines, for that location, at 64, numbers of groups for the locations, and, at 66, determines pairings of participants for each group at each location before looping back to the step at 62. Further, if locations or venues are geographically close to one another, then the server 12 can match or pair the participants and then arrange them into groups that are directed to different locations. Alternatively, the server 12 can be configured to direct all the participants to a different location. Thus, the server 12 can be configured for multiple different scenarios depending on the types of events.

At 68, the directions or instructions for participating in the dating rounds as defined by the social networking instances are sent to the terminal devices 16 of the participants at their respective locations. In that case, the directions can include directing a participant at one location to relocate to another location if the social networking instance determined that an appropriate pairing or match is found for that participant at the other location.

Subsequently, participants can confirm, with the terminal devices 16, that they have met with their respective paired participants, and, optionally, provide feedback information for use in determining a successive social networking instance for a successive dating round. In another embodiment, feedback information need not be provided after each round, and can rather be provided online after the event, for example the next day.

Figure 6:
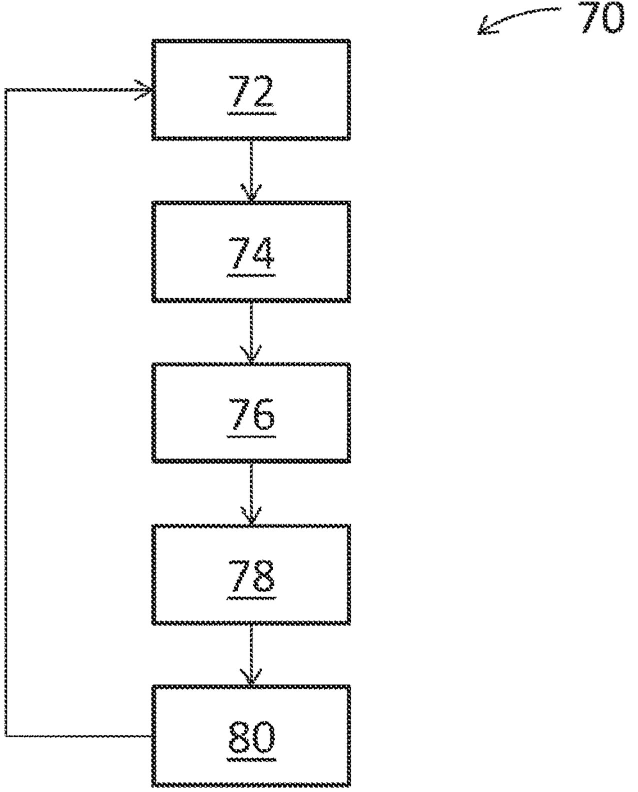
FIG. 6 shows a flow diagram of a step in more detail in another embodiment of a method for directing participants in a social networking environment, also at one or more locations or venues.

In another embodiment, the server 12 can be used to direct participants during a social networking event, such as a dating event, that progresses with each dating round from one location to another location. In such a case, prospective participants are detected at each location, and participants that opt in to participate are flagged at the server 12 for inclusion in construction of the social networking instance for that round at that location or venue. An example of this is shown in FIG. 6 where reference numeral 70 generally indicates a flowchart representing that process. At 72, a notification is sent to prospective participants at a location or venue to relocate to another location or venue. At 74, the participants that would like to participate in the dating round are then determined, as described above, and at 76 and 78, the groups and/or pairings for the participants are determined according to a social networking instance for the round at the location. At 80, the directions or instructions are sent to the participants for meeting with their groups and paired participants. It is to be understood that "opting in" is not always necessary. In various exemplary embodiments, the participants can be automatically included. Furthermore, it is not necessarily the case that the participants will move on every round. It is likely that moving will only take place once or twice a night.

Subsequently, and broadly as explained above, participants can confirm using their terminal devices 16 that they have met with their respective paired participants, and provide feedback information for use by the server 12 when determining a successive social networking instant for a successive dating round. Instead, feedback information can be provided by the participants at a later time.

In further embodiments, the server 12 can be configured to generate social networking instances based on attributes that match participants that share common interests to match potential friends or business connections, and not necessarily participants for dating.

Also, in another embodiment, the server 12 and the terminal devices 16 can be configured to include games, challenges, questions that participants can ask each other, and the like to facilitate meeting and to overcame awkwardness. For example, an introductory game can include being prompted to approach another participant of the opposite gender and to ask them to fill in their name on their terminal device. The terminal device 16 can be configured to prompt the participant to ask a question. Answers to those questions can gain game points for which prizes can be awarded. Participants can gain points in various other ways, for instance when they actually meet up, or answer questions, do puzzles together, and the like. It will be appreciated that information gathered by the server 12 as result of these activities can be used to generate useful information such as developing trends within group or groups of participants and likes and dislikes of various individual participants. These can be used by the server 12 to improve matching processes through, for example, heuristic processes.

In still another embodiment, the server 12 and the terminal devices 16 can also be configured to generate social networking instances for ad hoc or one-on-one meetings or for relatively smaller groups, for example, such as a group for a dinner dating event. Participants may be contacted, for example, by way of SMS or some type of alert, or push notification, and asked if they would like to meet another participant at that time. If the response is in the affirmative, then the server 12 can find another interested participant nearby, and send directions or instructions to the participants to assist them with meeting each other. Alternatively, the server may be configured to send invitations to any number of participants and then carry out the matching process described herein on the people who replied in the affirmative.

The server 12 can be configured for issuing a voucher or be like to a participant when that participant is excluded from a dating round.

In addition, the server 12 can also be used to match participants online, for example, by being programmed with a web-based application that is accessed with thin clients.

The server 12 is configured to generate the social network instances for various types of events.

One example of a broad methodology for generating a social network instance, in other words a matching algorithm, is described below, followed by a description in the form of pseudo-code. These form the basis of a software product with which the server can be programmed. They also form the basis of the method of directing participants at a social networking event, as described herein.

Broadly, participants that have not been matched in a previous round are given a higher priority in matching, with participants missing more recent rounds given the highest priority.

The server 12 generates a list of women who are currently checked in and another list of men who are currently checked in. Compatibility scores are then created for each potential pair or group. Compatibility scores are based on 'attributes'. Note some couples are marked as unmatchable, for instance, if they have previously dated or if they can't be matched on an important attribute.

Attributes can include gender, height, age, education, religion, political views, personality type, exercise habits, life goals, extroversion levels and the like. They also include previous feedback and global system trends.

After a date, participants can indicate if they are romantically interested in the person who they dated, or if they want to be friends only, or if they never want to see them again. Thus, the server 12 can be configured to find trends of likes and dislikes and essentially to find a participant's preference.

Use of names in the examples provided is simply for illustrative purposes and is not intended to refer to any particular person.

In one example, if, previously, Sarah was romantically interested in Jack and Mike, and Penny was also previously romantically interested in Jack and Mike and the system finds that Penny also liked three other men, the server 12 will give a higher rating to those three men for Sarah, That is, the server 12 identifies a trend in taste between Sarah and Penny. The larger the crossover in taste the higher the attribute is ranked for Sarah. Similarly, if patterns of dislike are found, those people will be downgraded or removed from Sarah's list.

Some of the attributes involve answers of participants to personality questions that can be completed on a website and stored in the database. The server 12 can be configured to consider previously matched dates in which participants have provided positive feedback about each other and to determine correlations in their personality answers. For example, participants that have the same preference in movie genres are more likely to get along.

Because the algorithm is run at the event it is appropriately time efficient. Such efficiency would not be possible if attempts were made to carry out the steps of the method without executing a software product that embodies the algorithm.

An initial threshold compatibility t is set based on the overall group size. Participants are then matched based on reaching a threshold positive compatibility score. This matching procedure is repeated for each participant until a relevant match is determined. The order that participants are matched is changed on each round to remove bias. If an unacceptable number of participants are left out of this matching process, the server 12 will update t for subsequent matching rounds, and increase the compatibility scores for the unmatched participants by a small increment. The server 12 will then redo the matching. This will usually complete the matching. However, if an acceptable matching is still not found, and the participant size is small, the server 12 will create a path graph of the matchings and high score potential matchings. If the server can determine an augmented path between an unmatched male and an unmatched female, it will take the symmetric difference and increase the matching by one.

Participant compatibilities or compatibility values are stored in a matrix to, inter alia, avoid order bias. Extra measures are taken for subsequent rounds to prevent duplicating pair matchings from a previous round or to prevent unwanted potential matches, such as between friends. This is achieved by altering their compatibility in the matrix. An example of this is illustrated below in Phase A(b). Additionally, if numbers are uneven, for instance there are more women than men, then some participants must be left out of each matching round. In this instance, it is desirable to ensure that being excluded from the dating pairs is shared evenly amongst the participants. This is managed by giving the participants who missed the previous round a higher matching priority. This concept can be taken further with weightings of matching priority depending on importance. For instance, a participant who missed the last round can have higher matching priority than a participant who missed the round before this and so on. It is important to note that, in this instance, matching priority does not increase or decrease the quality of a participant's match compared to the other pairings in the group, but ensures that the participant has a greater chance of being matched in the current round. Participants are given priority in the matrix by manipulating their compatibility with dummy columns in the matrix. An example of this is illustrated in Phase A(b) below. The set of pairs with maximum cardinality and the highest group compatibility score are then taken. Paths (a) or (b) can be taken in the algorithm.

The following is a description of an algorithm that is embodied in a software product or set of instructions stored in a non-transitory data storage medium capable of being read or executed by the server 12 to generate the social networking instance in the form of the data construct described above having data representing matched pairings of participant identifiers. In other words, data elements or components representing participant identifiers are transformed, by the algorithm, into data elements or components that represent matched pairings of participant identifiers.

Let acceptable system matches for members of X be represented as follows:

$$x_1: y_{x11}, y_{x12}, \ldots, y_{|x1|}$$

$$x_2: y_{x21}, y_{x22}, \ldots, y_{|x2|}$$

$$\ldots$$

$$x_n: y_{xn1}, y_{xn2}, \ldots, y_{|xn|}$$

Where $x_i$ and $y_i$ are participant identifiers.

Let acceptable system matches for members of Y be represented as follows:

$$y_1: x_{y11}, x_{y12}, \ldots, x_{|y1|}$$

$$y_2: x_{y21}, x_{y22}, \ldots, x_{|y2|}$$

$$\ldots$$

$$y_m: x_{xm1}, x_{xm2}, \ldots, x_{|ym|}$$

Let X be a set of men of size m, where $X=\{x_1, x_2, \ldots, x_m\}$, and r ($0<r<=m$) is an integer.

Let Y be a set of women of size n where $Y=\{y_1, y_2, \ldots, y_n\}$, and i ($0<i<=n$) is an integer U is the set of all participants such that $U=X\cup V$ ($X\cap Y=\emptyset$).

When $L(x_r)$ is true it means that $x_r$ is checked in to the system for matching, it follows that:

L(i) is true, $\forall i \in U$

L(x) is true, $\forall x \in X$

L(y) is true, $\forall y \in Y$

Thus, inputs have been received from the terminal devices that prospective participants are available at an event.

Let $T(x_r)$ represent the set of acceptable matches for $x_r$, and $P(x_r)$ represent a specific acceptable match for $x_r$ that is, $P(x_r)\in T(x_r)$ and (x $P(x_r)$) form acceptable pairs.

If follows that $P(P(x_r))=x_r$, that is, if a match is acceptable to x, it is acceptable to y.

$T(x_r)=\{Y_{xr1}, Y_{xr2}, \ldots, Y|xr|\}$ therefore $(x_r, y_{xr1})$, $(x_r, y_{xr2})$, $\ldots$ ,$(x_r, y_{|xr|})\}$ form acceptable pairs in U.

S is a set of matched pairs such that $\forall(x_r, y_j)\in S$, $x_r\in T(y_j)\wedge A\ y_j\in T(x_r)$. Further, S must satisfy the exclusivity condition $(x_r, y_i)\in S \oplus (x_r, y_j)\in S$, where j ($0<j<=n$) is an integer and ($j< >i$).

Let $S_I$* represent the maximum cardinality set of matched participants for the instance I of U. Complete matching is achieved when $|S_I|=|S_I*|$. The function $f(n, m, C)\rightarrow J_I=|S_I*$ , calculates optimum cardinality of the instance I. Where the meaning is clear we will simply refer to $J_I$ as J, $S_I$ as S and so on.

Let the various compatibilities of participant pairs be represented as C(x, y), an implementation of this is illustrated in match( ) described below.

When $D(x_r)$ is true it means that $x_r$ missed out on a match in a previous round iteration and has been set for priority matching.

Let Z be a set of one or more locations where people are checked in.

Let H be the largest C(x, y) value in matrix E.

Let V be an array of arrays of length e, containing participants for weighted priority matching, where a is an integer.

Let F be an integer, such that F >=H.

Let Q represent a dummy column or row, with initial values of F, where $Q_1$ represents the first, $Q_2$ represents the second, and so on.

Let K be a large integer, such that (K-H >0) A (e*(K-H) F<max_integer), where max_integer is the max allowable integer in the programming language.

Let R be a set of forbidden matches, such as previous pairings.

Set out below is pseudo-code representing the operation of the algorithm.

Phase A(a)

```
match(i), ∀i ∈ U, where D(i) ∧ i ∉ S
match(j), ∀j ∈ U, where j ∉ S
if |S| = J, return S;
else {
  where D is the set of unmatched participants, set D(d) true, ∀d ∈ D.
  increase t for this event
  run Phase A of the algorithm again
  if |S| = J, return S
  else {
    if |U| < 60 {
generateGraph( )
  findAugmentingPaths( );
    take the symmetric difference to gain matches
  }
  }
}
```

Phase A(b)

```
remove non-activated matches;
  ∀ Z {
    Matrix E;
    set E[a_d , r_b] = F − C(a_d , r_b), a_d ∈ U ∧ r_b ∈ U, where
    (0 < d <= m ∧ 0 < b <= n) ∨ (0 <
d <= n ∧ 0 < b <= m), and d and b are integers.
    set E[a_d , r_b] = F + (K − H), where (a_d , r_b) ∈ R and
    (0 < d <= m ∧ 0 < b <= n) ∨ (0 < d
<= n ∧ 0 < b <= m), and d and b are integers.
    if (m <> n) {
      for (int i=0; i<|m−n|; i++) {
        E = E + Qi;
      }
      generate V;
      for (int i=0; i<e; i++) {
        setWeight(V[i], i+1);
      }
    }
    return max(E);
  }
setWeight(p, z) {
```

-continued

```
        for (int i=0; i<p.length; i++) {
            ∀f (set E[p[i], Q_f] = z*(K−H) + F) ∨
            (set E[Q_f, p[i]] = z*(K−H) + F), where (0<f<=
    |m−n|) and f is an integer
        }
    }
```

Phase B

Group unmatched people into friend dates, in a similar way to Phase A potentially with different attribute ordering and group sizes.

Phase C activate(S);

This will set the matches active, and send meetup information to participant devices.

Phase D

Receive Feedback from participant devices 16.

The function match( ) is described below:

Let q be the number of matchable participant attributes, it then follows that $C(x, y)=a_q+a_{q-1}*10+a_{q-2}*100 \ldots +a_1*10^{q-1}$, where $a_j$ is an attribute used for matching, and a $(0<j<=q)$ is an integer.

Participant attributes can include gender, height, education, religion, politics, personality type, exercise, and so on. Attributes are set in order of importance, with the most important attribute being $a_1$, the second most important attribute being $a_2$ and so on.

Participants rate their dates after they have met. They can rate them on 3 levels with the highest rating declaring that they are romantically interested in that participant.

Let R(y) represent the set of participants in whom participant y has marked a romantic interest.

TT(y) is then set as an attribute and defined as: $TT(y)=R(h)\backslash R(y)$ where $R(y)\cap R(h)< >\emptyset$, finding intersecting sets with people who give similar feedback. Likewise, the negative of this is used as a negative matching attribute.

Global system trends, in the form of answers to personality questions, are also automatically updated in the system as attributes. For example, if 70% of people who like horror movies and vote conservative rate each other highly, then liking horror movies and voting conservative is set as an attribute in the system.

Let t be a threshold positive match value such that if the condition $C(x_r, y_i)\ \max(C(x_d, y_b))-t$ is satisfied $(x_r, y_j)$ are considered a strong match. Where $d(0<d<=m)$ is an integer, $(0<b<=n)$ b is an integer (and $y_b< >y_i$).

Let W(k) be the set of participants who are a strong match for k such that $P(k)\in W(k)$, $C(k, P(k))>\max(C(x_d, Y_b))-t$ Let N(j) represent the general compatibility of j in the system.

Define match(v) as:

If $T(v)=\emptyset$ return null, as no match can be found.

else

Date $d=(v, P(v))$, $P(v)\in W(v)\wedge N(P(v))<=N(t)$, where $t\in W(v)\wedge t< >P(v)$.

Create the date in the system, mark v and P(v) as matched and return.

The function tindAugrnentingPaths( ) searches for augmenting paths in the data, working with the top three preferences for each participant. The concept of an augmenting path would be known by a person of ordinary skill in the art. The function makes use of augmenting paths in a bipartite graph. Such a graph starts from an unmatched node and ends at an unmatched node. Along its path it alternates between matched edges and unmatched edges. When an augmenting path is found, the edges can be reversed to make the matched edges unmatched and the unmatched edges matched to add one more match to the graph.

The embodiments described are useful in that the server creates social networking instances in real-time during an event, and can create successive social networking instances for successive rounds of dating taking into account feedback information from a previous round of dating which improves the relevance of matching participants with each successive round in real-time during events.

Further, the embodiments described keep track of which participants were paired or matched in a previous round, to avoid pairing or matching participants in a successive round with the same participants as in a previous round.

The server and terminal devices are configured so that social events are scalable, in the sense that an event can run at a single location, or run over multiple locations with many participants. Moreover, the participants can be grouped into groups, sub-groups, and the like, as is needed to facilitate the event.

The embodiment described determines which participants are at an event, and allows participants to opt in or out before a round of matching during an event, which reduces the risks of other participants being inadvertently stood up.

Participants that miss out on a round of matching can be noted by the server and afforded priority to participate in a successive round.

Features are included in the embodiments that are useful also allow participants to be easily relocated to other locations, either to meet more relevantly matched participants or as part of a relocating event in which all the participants are relocated to other locations.

The embodiment also includes features that assist a participant with finding his or her matched participant, such as displaying an image of the matched participant, and providing a means for the participants to contact each other at the time, such as messaging functions or a phone calling function that can be activated for a limited time, for example for about 10 minutes while the matched participants find each other.

Moreover, the embodiment is enabled to detect if there is not enough information for a participant to be matched, and can resolve that by prompting a participant to enter more information while the participant is at the event.

The embodiment can be enabled to get participants to take part in games, treasure hunts, competitions, ask each other introductory questions, and the like.

An embodiment of this kind has a useful success rate in matching participants, and events using this embodiment can require hardly any, if any, input from an event host, and can require hardly any, if any, manual administration. In some case, when a host is present, the host can use a suitable device to enter participants and the like electronically.

As is clear from the above description, matching is live, in the sense that it cannot happen unless participants are present. Thus, being stood up as a result of a participant not attending is avoided.

The appended claims are to be considered as incorporated into the above description.

Throughout the specification, including the claims, where the context permits, the term "comprising" and variants thereof such as "comprise" or "comprises" are to be interpreted as including the stated integer or integers without necessarily excluding any other integers.

The invention claimed is:

1. A terminal for facilitating terminal interactions involving at least one networking round, the terminal comprising:
   a processor;
   a storage unit comprising instructions, the instructions configured to cause the processor to:
      receive a notification regarding an event from a server;
      send a confirmatory wireless signal to the server indicating availability of a first participant to participate in the event;
      receive, from the server, a wireless indication of a commencement of a first networking round with a second participant associated with a second terminal, wherein the second participant is selected, by the server, among a group comprising at least two available participants based on a threshold compatibility that is set based on a number of participants in the group, wherein the group of available participants are matched to maximize a number of matched pairs, and wherein each participant in the group of available participants is paired with a maximum of one other participant in the group of available participants in a given networking round;
      send, to the server, a confirmation of participation in the first networking round; and
      receive communication instructions configured to cause the processor to establish audio or video communication with the second terminal for participating in the first networking round.

2. The terminal of claim 1, wherein the instructions are further configured to cause the processor to receive a request from the server to provide data for matching the first participant with the second participant.

3. The terminal of claim 1, wherein the sending of a confirmatory wireless signal occurs based on:
   receiving a communication, from the server, configured to cause the processor to generate a user interface confirming availability; and
   in response to receiving input via the user interface, sending the confirmatory wireless signal to the server.

4. The terminal of claim 1, wherein the first networking round commences with a plurality of matched participants, each matched participant having a respective terminal.

5. The terminal of claim 1, wherein the instructions are further configured to cause the processor to:
   receive activity instructions that cause the processor to generate a user interface displaying one or more challenges;
   in response to receiving input via the user interface, collect the input as activity information associated with the first participant; and
   send, to the server, the collected activity information for matching the first participant with another participant in another networking round.

6. The terminal of claim 1, wherein the instructions are further configured to cause the processor to:
   request feedback information on the first networking round from the first participant; and
   send the feedback to the server for use in a second networking round.

7. The terminal of claim 6,
   wherein generating matches in the second networking round is based at least partially on matched and unmatched participants from the first networking round, and
   wherein an unmatched participant from the first networking round is selected with higher priority than the matched participants for generating matches in the second networking round.

8. The terminal of claim 1, wherein at least two participants of the group of available participants are associated with different physical locations.

9. The terminal of claim 1, wherein the second participant is selected among the group of available participants so that a cardinality of matched pairs among the group of available participants is optimized.

10. The terminal of claim 1, wherein the second participant is selected based on a detected correlation between the first participant and a third participant.

11. A method for facilitating terminal interactions involving at least one networking round, the method comprising:
   receiving a notification regarding an event from a server;
   sending a confirmatory wireless signal to the server indicating availability of a first participant associated with a first terminal to participate in the event;
   receiving, from the server, a wireless indication of a commencement of a first networking round with a second participant associated with a second terminal, wherein the second participant is selected, by the server, among a group comprising at least two available participants based on a threshold compatibility that is set based on a number of participants in the group, wherein the group of available participants are matched to maximize a number of matched pairs, and wherein each participant in the group of available participants is paired with a maximum of one other participant in the group of available participants in a given networking round;
   sending, to the server, a confirmation of participation in the first networking round; and
   receiving communication instructions configured to cause the first terminal to establish audio or video communication with the second terminal for participating in the first networking round.

12. A server for facilitating terminal interactions involving at least one networking round at a location, the server comprising:
   a processor;
   a storage device comprising instructions, the instructions configured to cause the processor to:
      receive signals indicating availability of a plurality of terminals, the signals having been wirelessly emitted by the plurality of terminals;
      generate a social networking instance comprising data for matching at least a first participant and a second participant during a first networking round, wherein the first participant is associated with a first terminal of the plurality of terminals and the second participant is associated with a second terminal of the plurality of terminals, wherein matching the first participant and second participant is based on a threshold compatibility that is set based on a number of participants in a group of available participants, wherein the group of available participants are matched to maximize a number of matched pairs, and wherein each participant in the group of available participants is paired with a maximum of one other participant in the group of available participants in a given networking round;
   generate at least one match based on the social networking instance;

receive, from at least the first terminal, a confirmation of participation in the first networking round;

generate second instructions configured to cause a processor of at least the first terminal to establish audio or video communication with another terminal for participating in the first networking round; and send the second instructions to at least the first terminal.

13. The server of claim 12, wherein generating the social networking instance further comprises:

generating a communication configured to cause a processor of a terminal of the plurality of terminals to request confirmation for participation in the first networking round;

wirelessly sending the communication to at least one terminal of the plurality of terminals;

receiving a confirmatory wireless signal indicating participation in the networking round from at least the first terminal; and including an identifier of at least the first terminal in the social networking instance.

14. The server of claim 12, wherein the instructions are further configured to cause the processor to:

generate a communication configured to cause a processor of at least one terminal of the plurality of terminals to generate a user interface to request data for matching at least one participant associated with the at least one terminal with at least one other participant having another terminal;

wirelessly send the communication to the at least one terminal; and receive, from the at least one terminal, the data for matching the at least one participant.

15. The server of claim 12, wherein the social networking instance links participant identifiers based on participant attributes to define matched participants.

16. The server of claim 12, wherein the instructions are further configured to cause the processor to:

receive feedback from at least the first terminal relating to the first networking round;

associate the received feedback from at least the first terminal with an identifier of the first participant; and generate, using the received feedback, a second social networking instance for a second networking round.

17. The server of claim 16, wherein generating matches in the second networking round is based at least partially on matched and unmatched participants from the first networking round, and wherein an unmatched participant from the first networking round is selected with higher priority than the matched participants for generating matches in the second networking round.

18. The server of claim 12, wherein the instructions are further configured to cause the processor to generate matched pairs from the group of available participants so that a cardinality of matched pairs among the group of available participants is optimized.

19. The server of claim 12, wherein the first networking round commences with a plurality of matched participants, each matched participant having a respective terminal.

20. The server of claim 12, wherein the instructions are further configured to cause the processor to:

send activity instructions that cause a processor of at least the first terminal to generate a user interface displaying one or more challenges and collect input as activity information associated with at least the first participant; and send the collected activity information, wherein the collected activity information is used to match at least the first participant with another participant in another networking round.

21. The server of claim 12, wherein the instructions are further configured to cause the processor to:

detect a correlation between the first participant and a third participant; and based on the detected correlation, generate a match between the first participant and a fourth participant associated with the another terminal.

22. A method for facilitating terminal interactions involving at least one networking round at a location, the method comprising:

receiving signals indicating availability of a plurality of terminals, the signals having been wirelessly emitted by the plurality of terminals;

generating a social networking instance comprising data for matching at least a first participant and a second participant during a first networking round, wherein the first participant is associated with a first terminal of the plurality of terminals and the second participant is associated with a second terminal of the plurality of terminals, and wherein matching the first participant and second participant is based on a threshold compatibility that is set based on a number of participants in a group of available participants, wherein the group of available participants are matched to maximize a number of matched pairs, and wherein each participant in the group of available participants is paired with a maximum of one other participant in the group of available participants in a given networking round;

generating at least one match based on the social networking instance;

receiving, from at least the first terminal, a confirmation of participation in the first networking round;

generating second instructions configured to cause a processor of at least the first terminal to establish audio or video communication with another terminal for participating in the first networking round; and sending the second instructions to at least the first terminal.

* * * * *